United States Patent [19]

Blumbach et al.

[11] Patent Number: 4,936,400
[45] Date of Patent: Jun. 26, 1990

[54] DEVICE FOR SECURELY COVERING AIR VENTS IN SPECIAL-PURPOSE VEHICLES

[75] Inventors: Götz-Peter Blumbach, Schwerte; Friedrich Neuhaus, Dortmund, both of Fed. Rep. of Germany

[73] Assignee: Hoesch Aktiengesellschaft, Dortmund, Fed. Rep. of Germany

[21] Appl. No.: 355,060

[22] Filed: May 18, 1989

Related U.S. Application Data

[63] Continuation of Ser. No. 152,621, Feb. 5, 1988, abandoned.

[30] Foreign Application Priority Data

Feb. 6, 1987 [DE] Fed. Rep. of Germany ....... 3703716

[51] Int. Cl.$^5$ .................. B60K 11/00; B60K 11/04; B60K 11/08; B60K 13/02
[52] U.S. Cl. .................. 180/68.1; 180/68.6; 98/121.1; 55/440; D12/163; D23/387
[58] Field of Search .................. 180/68.1, 68.6; 296/208; D12/163, 181; D23/387; 98/121.1; 55/440

[56] References Cited

U.S. PATENT DOCUMENTS

| | | |
|---|---|---|
| 1,785,682 | 12/1930 | Hamilton .................. 98/121.1 X |
| 1,919,227 | 7/1933 | Knox et al. .................. 180/68.1 X |
| 2,655,091 | 10/1953 | Geiger .................. 296/208 X |
| 2,808,900 | 10/1957 | Miller, Jr. et al. .................. 55/440 |
| 2,962,956 | 12/1960 | Magyar .................. 98/121.1 |
| 3,358,580 | 12/1967 | Freese et al. .................. 55/440 |
| 3,771,430 | 11/1973 | Lane .................. 98/121.1 |
| 3,970,439 | 7/1976 | Murphy .................. 55/440 |
| 4,335,797 | 6/1982 | Simmons .................. 98/121.1 |
| 4,543,108 | 9/1985 | Wurz .................. 55/440 |
| 4,713,092 | 12/1987 | Kikuchi et al. .................. 55/440 |

FOREIGN PATENT DOCUMENTS

| | | | |
|---|---|---|---|
| 3404887 | 8/1985 | Fed. Rep. of Germany ..... | 180/68.1 |
| 874339 | 8/1942 | France .................. | 98/121.1 |
| 58-47624 | 3/1983 | Japan .................. | 180/68.6 |

Primary Examiner—Charles A. Marmor
Assistant Examiner—Tamara L. Finlay
Attorney, Agent, or Firm—Max Fogiel

[57] ABSTRACT

A device for reliably covering air vents in special vehicles. The device consists of parallel strips of L-shaped or S-shaped structural section. The object is to reliably prevent not only foreign bodies but also migrating splinters thereof from penetrating inside. The end of each strip that points inside the vehicle has additional structures and parts thereof, some of which extend essentially at an angle to the end of the strip.

13 Claims, 7 Drawing Sheets

DEVICE FOR SECURELY COVERING AIR VENTS IN SPECIAL-PURPOSE VEHICLES

This application is a continuation of U.S. patent Ser. No. 07/152,621, filed Feb. 5, 1988, now abandoned.

BACKGROUND OF THE INVENTION

The invention concerns a device for reliably covering air vents in special-purpose vehicles, with parallel strips of L-shaped or S-shaped structural section.

Special-purpose vehicles, which are employed for what is called off-road operation, usually have their engine space and cooling system encapsulated to prevent the vehicle from breaking down due to damage to those components resulting from the entry of foreign bodies. The engine is usually supplied with combustion air and cooling air through protective grating systems. The engine spaces usually have two gratings, one for incoming air and one for outgoing air, with a ventilator suctioning in the requisite volume of air at the air-supply point (intake grating) and the used air flowing out freely in the vicinity of the outlet grating.

Protective mechanisms of this type demand that the overall system be open enough to allow an adequate air flow and that the air channels will be structured to reliably prevent foreign bodies from entering.

The use of grating systems in the manufacture of motor vehicles is known, from German OS No. 2 206 754 for example. V-shaped or S-shaped structural sections are employed. The known gratings, however, have a drawback in that foreign bodies can still get in, depending on what direction they come from. It is also possible for the foreign bodies to enter not as complete wholes, but subsequent to breaking up on impact in the first part of the grating. It is also occasionally possible for splinters to travel through the air channel and damage the downstream components of the machine.

SUMMARY OF THE INVENTION

The object of the invention is accordingly to create a device of the aforesaid type that will reliably prevent not only foreign bodies but also migrating splinters thereof from penetrating inside the special-purpose vehicles.

Thicker areas in the strips in some embodiments of the invention additionally prevent the foreign bodies from passing the strips.

The advantages of the device in accordance with the invention are that not only foreign bodiess but also any splinters created when the foreign bodies strike the gratings are prevented from entering vehicles equipped with the grating, whereby the requisite air flow is also ensured.

The drawing schematically illustrates various embodiments of the invention.

DETAILED DESCRIPTION OF THE PREFERRED EMBODIMENTS

Figure 1:
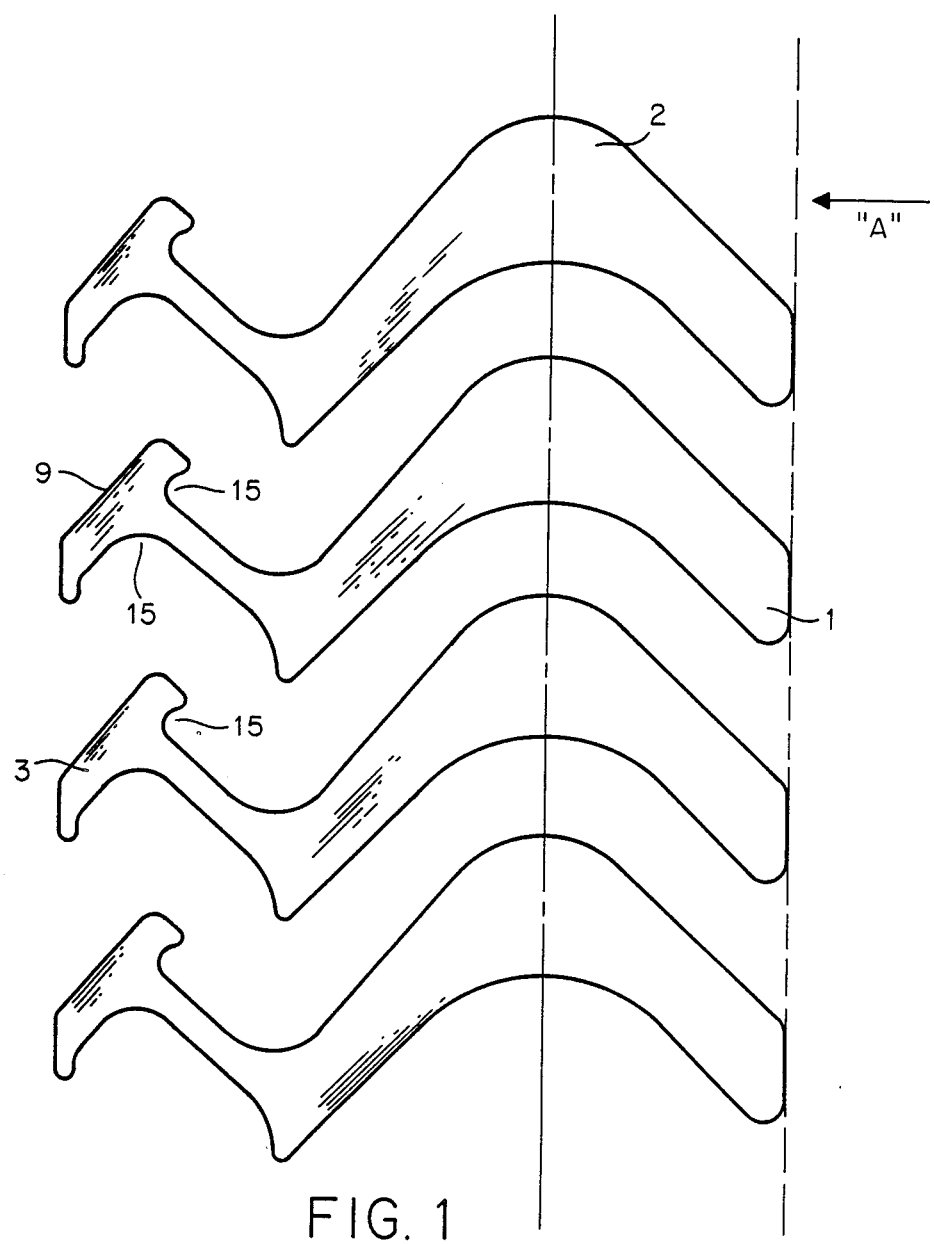
FIG. 1 is a section through an embodiment with several strips of structural section.

The device consists, as will be evident from FIGS. 1 through 6, of the requisite number of strips 1 of S-shaped structural section, which may be struck by foreign bodies arriving in the direction indicated by arrow A for example. The outer area 2 of each strip 1 is thicker, and each end that points toward the inside of the, vehicle has an additional structure 3, 4, 5, 6, 7, 8, and 16, portions 9, 10, 11, 12, 13, 14, or 17 of which extend transversely, creating more or less extensive pockets 15 at the end of each strip 1.

The thicker outer area 2 reliably prevents foreign bodies from passing through, and pockets 15 intercept any migrating splinters thereof.

The strips 1 and structures 3 illustrated in FIG. 1 are special-purpose one-piece strips.

Figure 2:
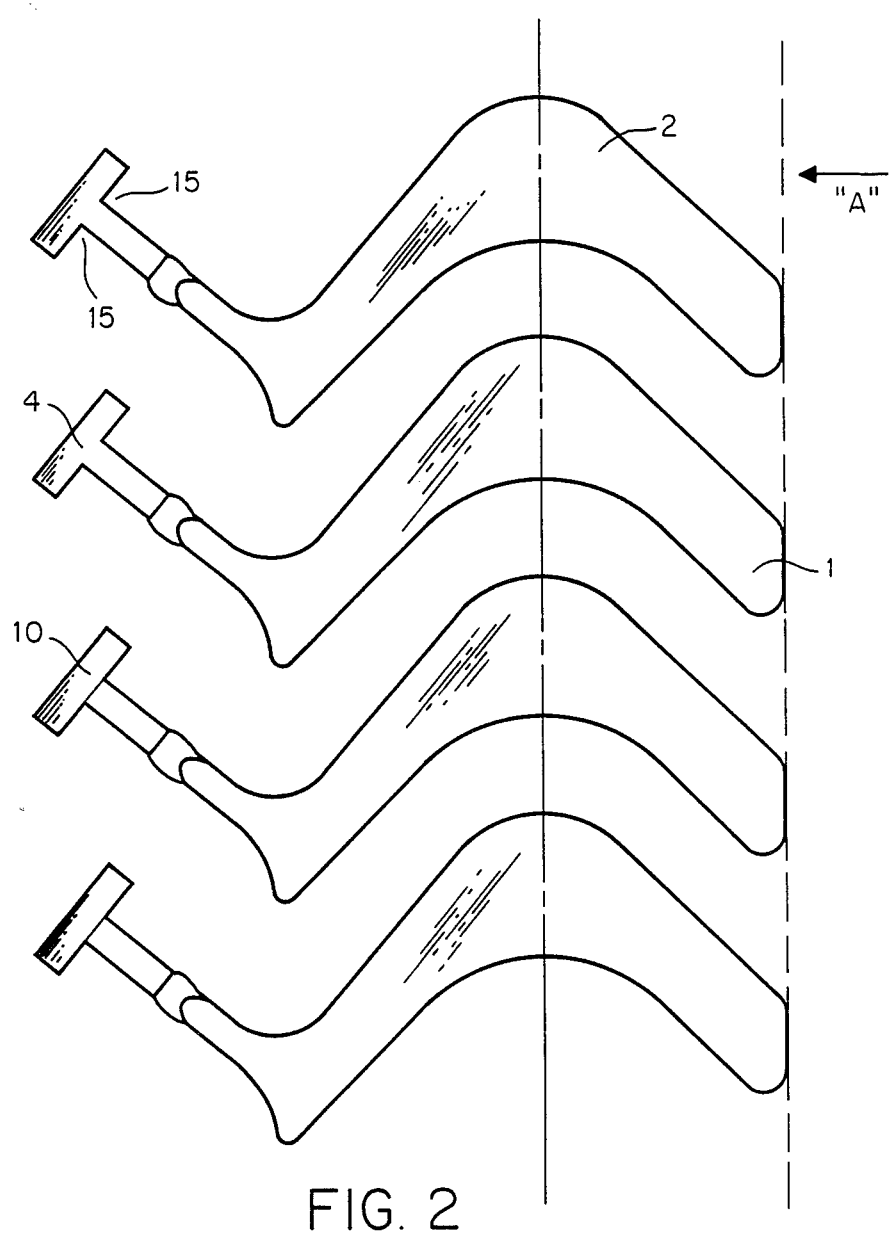
FIG. 2 is a section through another embodiment.

FIG. 2 illustrates strips 1 with strips 4 of T-shaped structural section previously welded onto them.

Figure 3:
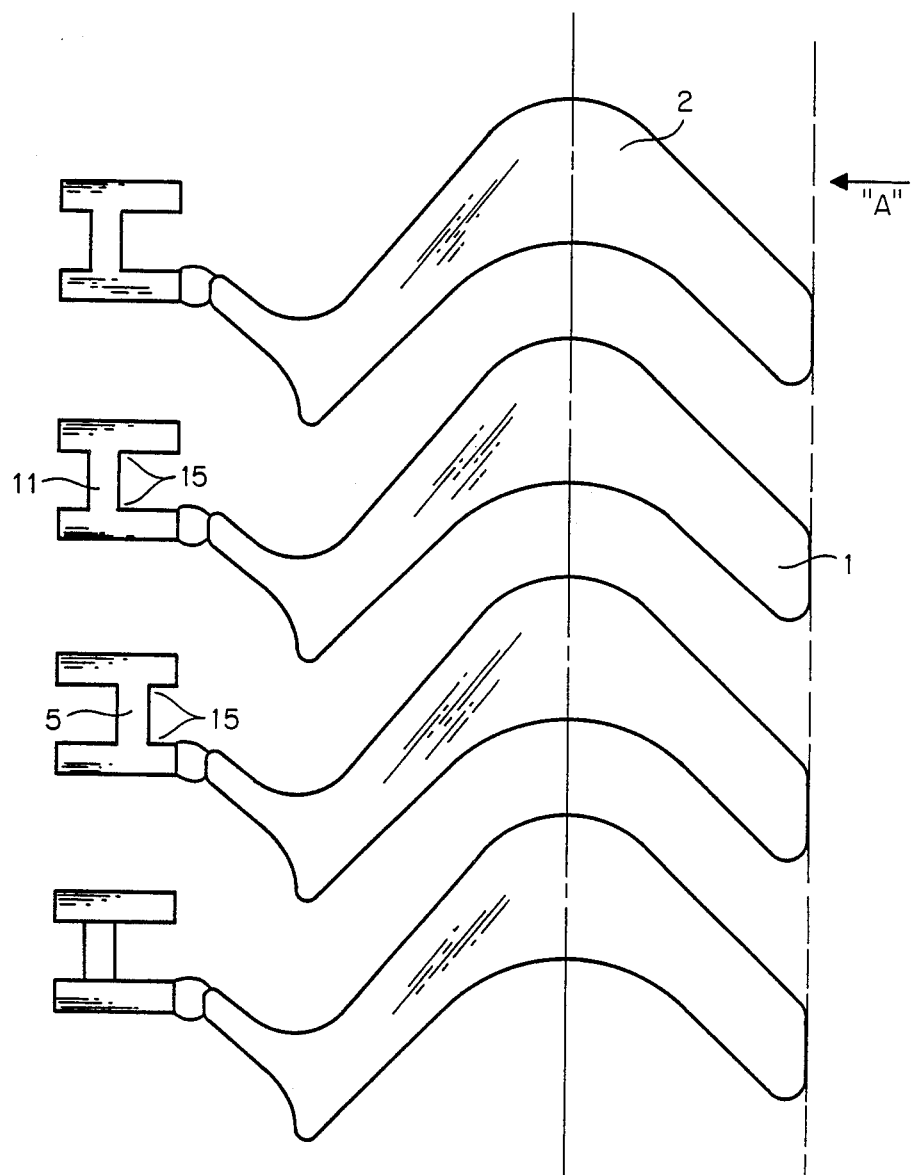
FIG. 3 is a section through a third embodiment.

FIG. 3 illustrates strips 1 with strips 5 of H-shaped structural section previously welded onto them.

Figure 4:
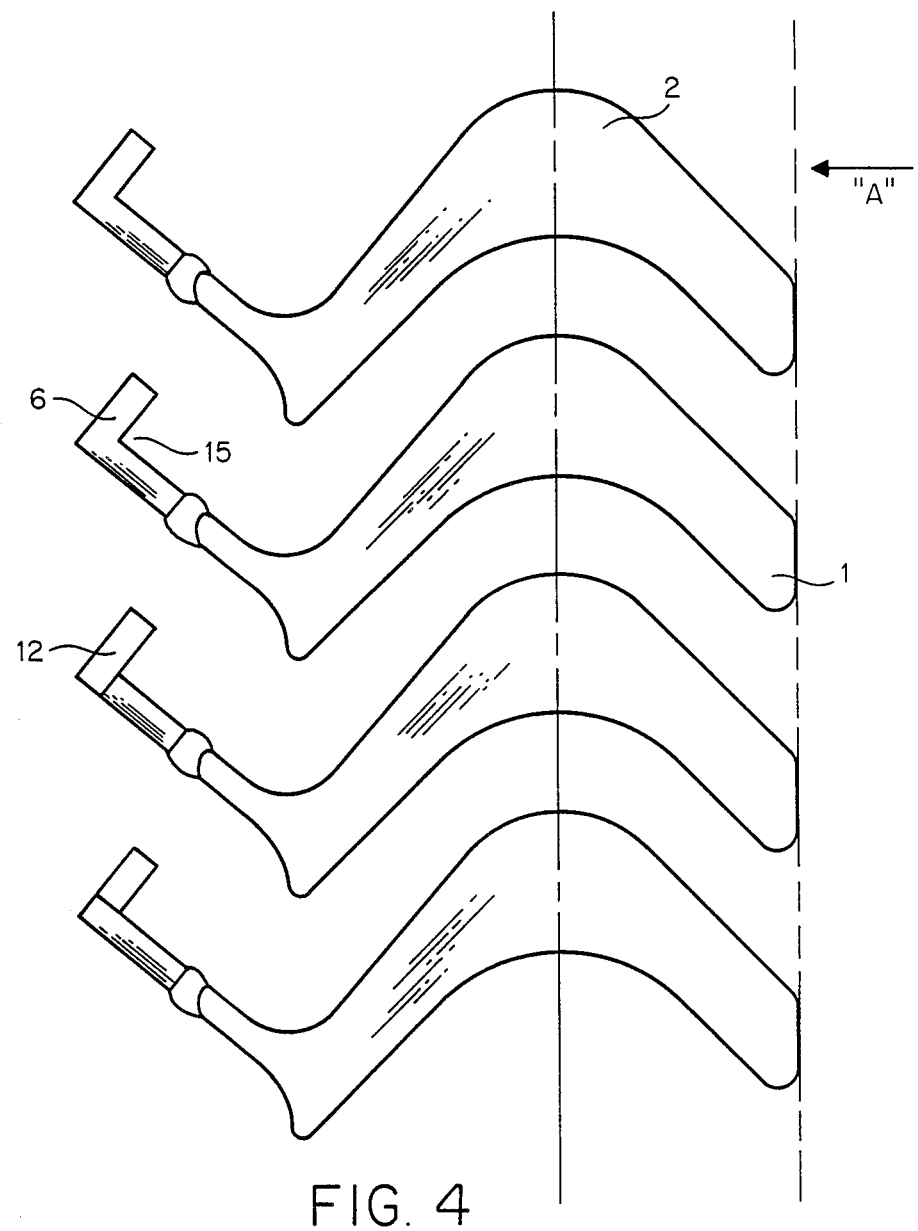
FIG. 4 is a section through a fourth embodiment.
Figure 5:
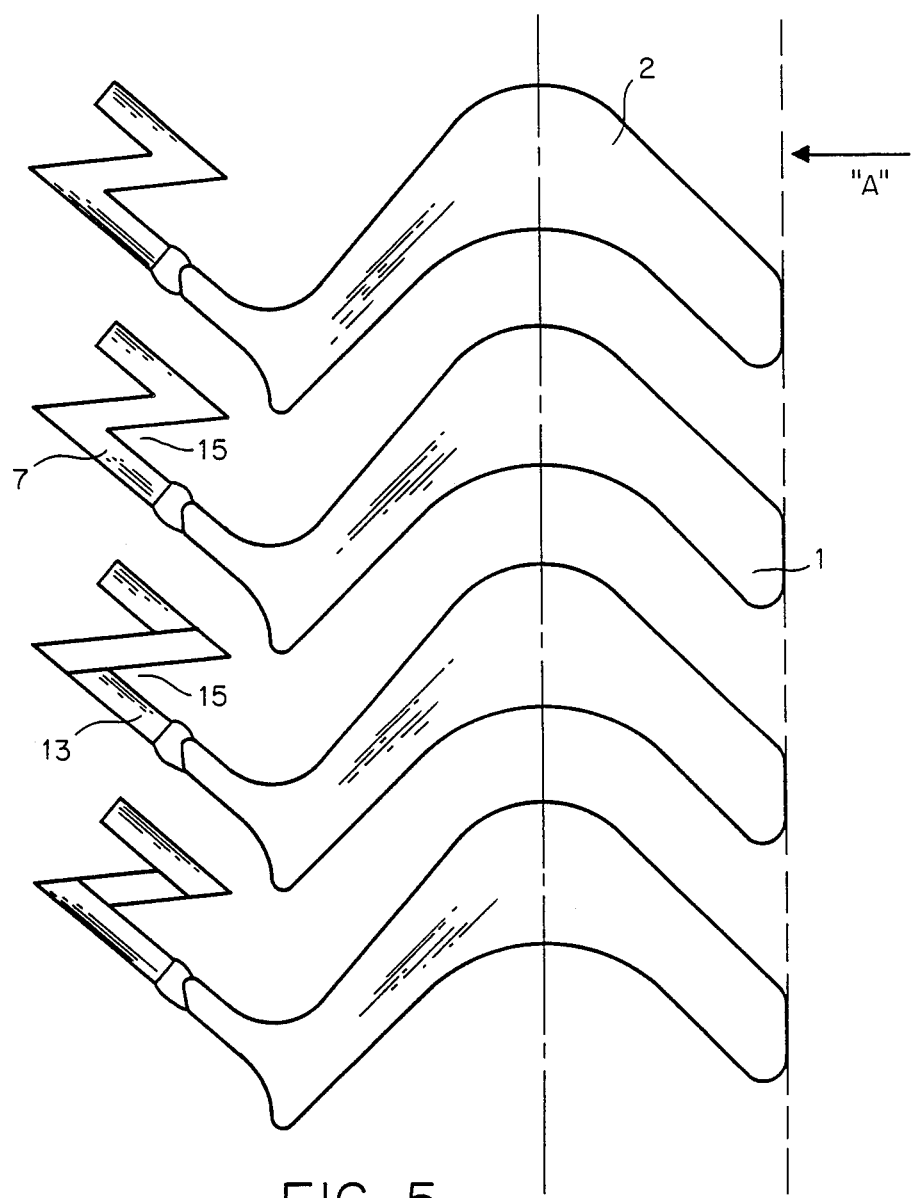
FIG. 5 is a section through a fifth embodiment.

FIGS. 4 and 5 illustrate strips 1 with strips 6 and 7 of L-shaped and Z-shaped structural section previously welded onto them.

Figure 6:
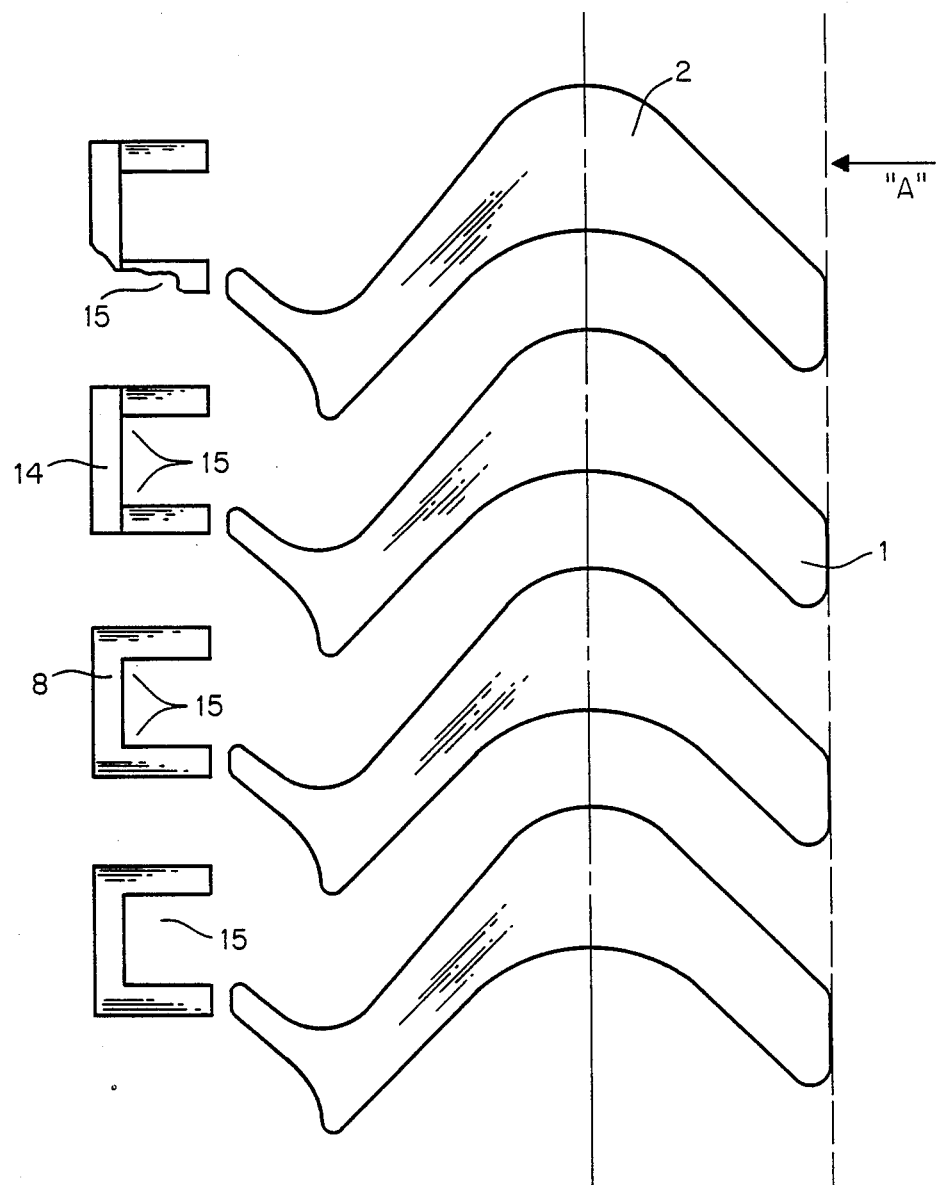
FIG. 6 is a section through a sixth embodiment.

FIG. 6 illustrates strips 1 and structures 8 mounted independent of each other.

Figure 7:
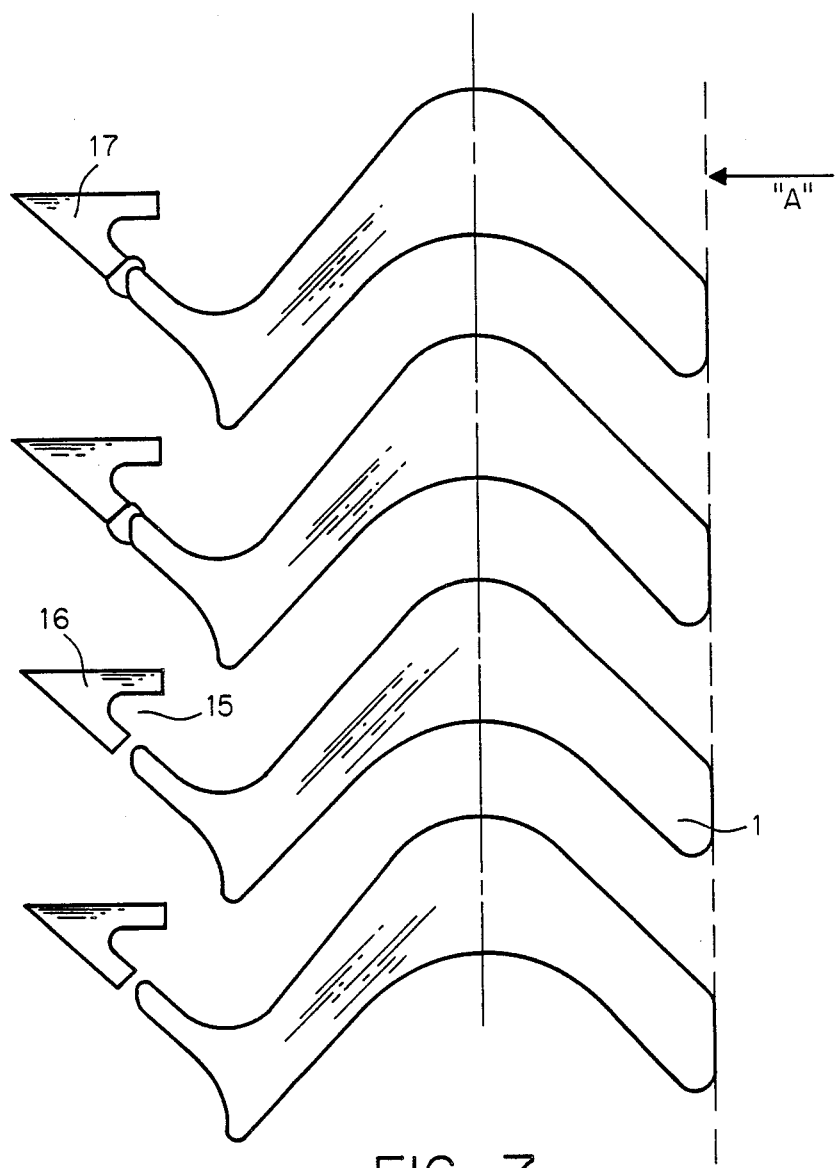
FIG. 7 is a section through a seventh embodiment.

FIG. 7 illustrates strips 1 and structures 16 mounted independent of each other.

Strips 1 and structures 3, 4, 5, 6, 7, 8, and 16 are made out of metal or metal alloys, and the strips 1 and structures 4, 5, 6, 7, 8, and 16 illustrated in FIGS. 2 through 7 can be made out of combinations of materials.

The strips and structural parts at the ends thereof may be installed separately in a vehicle during manufacture.

The strips and structural parts thereon may also be in the form of a single unit before installation into a vehicle.

The strips and structural parts at the ends thereon may be manufactured by either hot shaping or cold shaping.

The structural parts, moreover, may be symmetrical or asymmetrical in cross section. Thus, an L-shape profile is asymmetrical. The T and H-shaped profiles, on the other hand, can have a plane of symmetry.

We claim:

1. Apparatus for covering air vents reliably in special purpose vehicles for off-road operation to prevent penetration of foreign bodies and migrating splinters with high kinetic energy into the interior of said vehicles, comprising: a plurality of parallel S-shaped strips, each strip having only a single S-shape free of extensions therefrom; each strip having an intake end and an outlet end; air carrying foreign bodies moving past said strip from said intake end to said outlet end; said outlet end facing the interior of said vehicle, said intake end facing the outside of said vehicle; each strip having at said outlet end only a single structural portion of predetermined shape extending transversely to said strip and forming a pocket to catch said foreign bodies and prevent said foreign bodies from entering the interior of said vehicle, said structural portion being located at an end of said single S-shape coinciding with said outlet end; said strip having a thickened portion at a substantially central section directly on said S-shape of said strip between said intake end and said outlet end; said S-shape having a cross-section that increases continuously from said intake end to said central section where said cross-section is largest, said cross-section reducing from said central section to said outlet end.

2. Apparatus as defined in claim 1, wherein said structural portion of predetermined shape is welded onto said strip.

3. Apparatus as defined in claim 1, wherein said structural portion of predetermined shaped is integral and one piece with said strip.

4. Apparatus as defined in claim 1, wherein said structural portion of predetermined shape is T-shaped.

5. Apparatus as defined in claim 1, wherein said structural portion of predetermined shaped has an assymetrical T-shape.

6. Apparatus as defined in claim 1, wherein said structural portion of predetermined shaped is substantially I-shaped.

7. Apparatus as defined in claim 1, wherein said structural portion of predetermined shape is substantially V-shaped.

8. Apparatus as defined in claim 1, wherein said structural portion of predetermined shaped is substantially L-shaped.

9. Apparatus as defined in claim 1, wherein said structural portion of predetermined shape is substantially U-shaped.

10. Apparatus as defined in claim 1, wherein said structural portion of predetermined shape is substantially Z-shaped.

11. Apparatus as defined in claim 1, wherein said strip and said structural portion of predetermined shape are formed by cold shaping.

12. Apparatus as defined in claim 1, wherein said strip and said structural portion of predetermined shape are formed by hot shaping.

13. Apparatus as defined in claim I, wherein said structural portion of predetermined shape includes a substantially smaller cross-section than said cross-section of said outlet end and connecting said structural portion of predetermined shape to said outlet end of said strip.

* * * * *